United States Patent [19]

Shanklin et al.

[11] Patent Number: 4,537,016
[45] Date of Patent: Aug. 27, 1985

[54] HORIZONTAL FORM, FILL, SEAL MACHINES

[75] Inventors: Frank G. Shanklin, Groton, Mass.; Francis X. King, Nashua, N.H.

[73] Assignee: Shanklin Corporation, Ayer, Mass.; by said Francis Xavier King, Jr.

[21] Appl. No.: 454,688

[22] Filed: Dec. 30, 1982

[51] Int. Cl.³ ............... B65B 9/06; B65B 51/26; B65G 47/31
[52] U.S. Cl. ............... 53/493; 53/550; 53/373; 198/461; 198/575; 198/577
[58] Field of Search ............... 53/493, 550, 551, 552, 53/373; 198/460, 461, 575, 577, 341

[56] References Cited

U.S. PATENT DOCUMENTS

| | | | |
|---|---|---|---|
| 3,458,026 | 7/1969 | Lauzon et al. | 198/460 |
| 3,817,368 | 6/1974 | Wentz et al. | 198/575 |
| 4,141,196 | 2/1979 | Blanding | 53/373 |
| 4,197,935 | 4/1980 | Aterianus et al. | 198/460 |
| 4,210,237 | 7/1980 | Gram | 198/461 |
| 4,219,988 | 9/1980 | Shanklin et al. | 53/373 |
| 4,355,712 | 10/1982 | Bruno | 198/460 |

FOREIGN PATENT DOCUMENTS

| | | | |
|---|---|---|---|
| 2346407 | 3/1974 | Fed. Rep. of Germany | 198/460 |
| 1412700 | 11/1975 | United Kingdom | 198/460 |

*Primary Examiner*—E. Michael Combs
*Assistant Examiner*—C. Rosenberg
*Attorney, Agent, or Firm*—Charles E. Pfund

[57] ABSTRACT

A form fill seal type wrapping machine uses equal speed conveyors which are start/stop controlled to accept randomly fed packages and uniformly space them for wrapping and sealing in a roll fed wrapping material such as thermoplastic film. Different length packages can be wrapped without adjustment. One embodiment uses a traveling transverse seal mechanism so the machine can run continuously. Machine speed is enhanced by controlling dwell time for the transverse seal and time of travel for the transverse seal mechanism to be no longer than required to make the seal. A fast return mechanism for the transverse seal mechanism operates at a speed independent of machine speed.

21 Claims, 10 Drawing Figures

HORIZONTAL FORM, FILL, SEAL MACHINES

BACKGROUND OF THE INVENTION

Horizontal form fill seal wrapping machines are well known in the art and are generally characterized by a horizontal conveyor that transports discrete units of product through a forming head over which film is drawn to wrap the product in a continuous tube made by a bottom seal running longitudinally along the overlapped edges of the film after it has been formed into a tube. This tube containing spaced packages is then transversely sealed and severed to discharge units of product enveloped in a bag or envelope of the wrapping material having a longitudinal seal and two end seals. If shrink film is employed this package is generally discharged to a shrink tunnel where the film is heat shrunk to produce a tight-skinned package.

The general horizontal form fill seal machine of the prior art uses a flighted infeed conveyor to present product to the forming head or to a conveyor which conveys product to the tube forming head in uniformly spaced sequence. Other versions of such machines employ a ram for conveying the product one unit at a time which is fed to a position in front of the ram and delivered to the film forming mechanism on each stroke of the ram.

Prior art packaging machines of the general type here under consideration have a number of disadvantages. If such machines are operated at high speed they become fairly complex and high in cost. Those which use a flighted infeed conveyor must be accurately timed and the speed control of the infeed conveyor has to be continuously variable in order to produce exactly the right spacing of product going through the machine. Usually since product is not available in uniform condition for feeding to the infeed conveyor, some type of product placement system or magazine or accumulating device must be employed. Such machines also generally run best with a continual flow of product and when properly installed and operating have the advantage of being able to run at substantial high speed (60 to 100 packages per minute or faster).

The prior art machines which use a ram to thrust the product into the film provide a simple transport mechanism and generally produce a tighter package because the package is thrust against the end seal made by severing the preceding package. This feature also results in a disadvantage since the infeeding package pressing against the newly formed transverse seal before it has had adequate time to completely cool can burst the seal or form a weakened seal that will burst in the shrink tunnel. This problem is particularly pronounced when polyethylene film is used since it takes much more time to set up than PVC or polyolefin shrink film. Also to develop package speeds of 30 packages per minute or more the ram has to operate with substantial acceleration and the resultant impact or force on the product is a disadvantage particularly with stacked, loosely packed or fragile articles. These problems, particularly the seal breakage problem, result in a practical barrier to higher machine speeds.

The speed with which the ram advances the product along the longitudinal sealing shoe is so high that it presents problems in forming an adequate longitudinal seal for the overlapped edges of the film that form the tube.

Ram type machines also have difficulty with high profile products since the transverse seal is formed close to the forming head and it is difficult to draw the tube down if the height of the product and hence the spacing between the top and bottom portions of the tube is large. If a longer ram stroke is used to remove the transverse seal downstream from the forming head the dynamics of ram motion require that the machine be slowed down.

Machines have been built in the past which use differential speed conveyors to transport product and develop the desired spacing between sequential units of product. Thus if an infeed conveyor is running at a given speed and it deposits product on an intermediate conveyor with differential speed control available between the linear speed of the two conveyors it is possible to adjust the relative speeds so that a spacing develops between sequential product as it is transported through the film forming head thus providing an adequate free space in the tube containing sequential product for making the transverse seals. Such machines require adequate control of the differential speeds of the conveyors, but even if this control is achieved, the shape, length, and weight distribution of each individual package must be uniformly the same, or the transfer of products from one conveyor to the next and thus the package spacing will vary. In reality, many products do not have this uniformity because of irregular weight distribution (natural products such as produce or loose or randomly picked products) or imperfect containers (such as freshly formed boxes with bottoms not perfectly flat). Even in a machine using differential speeds to separate abutting products and with a stop-start conveyor control sequence used to further control the spacing of packages, the speed variation and non-uniform product transfer characteristics previously described make it virtually impossible to obtain the accurate control of product spacing. Since the final appearance of the package is often dependent upon the amount of excess film left on the package ends, precise spacing is frequently essential for good final package appearance.

Machines of the prior art generally have requirements that restrict the input feeding of product in some manner. They cannot accurately space product in the tube of film simply and automatically while accepting randomly fed product including abutting adjacent product or interspersed product of substantially different lengths, shapes and weight distribution while running continuously at moderately high speeds up to 60 packages per minute or higher unless a magazine or some other type of accumulating device is added to the infeed.

SUMMARY OF THE INVENTION

The present invention provides a form fill seal machine of the horizontal type which forms a tube of wrapping material around spaced units of product that are provided by the controlled action of the conveyors of the machine to uniformly space product that is randomly delivered to the input. The machine forms both longitudinal and transverse seals at relatively high speed and without the disadvantages of the prior art machines such as those hereinbefore described.

In one embodiment of the invention control of sequential belt conveyors operating at substantially the same fixed speed transforms a randomly supplied succession of input product including product that may be directly abutted edge to edge into a stream of uniformly spaced products for entry into the enclosed tube of film formed therearound to be delivered to fixed sealing jaws with the conveyors suitably controlled to stop motion while the transverse seal is being made. In one preferred embodiment of this invention the randomly fed infeed conveyor and an immediately subsequent transfer conveyor are offset vertically such that the packages delivered by the infeed conveyor drop onto the transfer conveyor. Detection of the moment when the trailing edge of a package drops from the delivery of the infeed conveyor to the transfer conveyor provides one of the control point for operating the conveyors in combination with other sensors of package position on other conveyors to achieve the objectives of the invention. In another embodiment of the invention the infeed and transfer conveyors are controlled in a manner similar to the first embodiment but the transverse sealing jaws are mounted on a movable carriage to travel with the tube and enclosed packages thereby forming the transverse seal and severance between adjacent packages while moving at the speed of the conveyor thereby avoiding the necessity for any start stop motion under normal operating conditions. A feature of this second embodiment is an improved traveling transverse sealer which operates at belt speed of the conveyor while the seal is being made and which is provided with a return stroke energized by pneumatic actuators and controlled in a manner which avoids undue acceleration at either the start or finish of the return travel.

It is an object of the invention to provide moderately high packaging speed in a machine where the product is not pushed against a freshly made transverse seal to advance film through the machine thereby avoiding the problem and speed limitation involved in stressing freshly made transverse semi-plastic seals. A related object of the invention is to provide a machine which does not introduce violent acceleration to the package or product and, accordingly, can handle fragile products without requiring that they exhibit structural stiffness or cohesive stability since the product itself is not stressed.

An important object of the invention is to provide a form fill seal machine which can accept randomly fed product including product units that are abutting in edge to edge contact with control that permits the products to be accurately uniformly spaced as they pass through the machine either continuously or with start-stop motion as required.

Another object of the invention is to provide a form fill seal machine which permits the running of high profile packages since the transverse seal is made a substantial distance downstream from the film forming head.

A further object of the invention is to provide a machine which will accept a random mix of products varying greatly in length without adjustment or the requirement for operator attention.

Still another object of the invention in the modification disclosed is to provide an improved transverse end sealing mechanism which moves with the conveyor belt to form a transverse seal and thus permits machine operation at higher speed in terms of packages per minute and under normal operating condition moves packages through the machine continuously without start-stop motion.

A further feature of the disclosed modification is the automatic limitation of travel of the transverse sealing mechanism to be no longer than that required for making the transverse seal.

These and other objects of the invention will be apparent from the following detailed description and the accompanying drawings which show the preferred embodiments of the invention as presently practiced.

DESCRIPTION OF THE DRAWINGS

Referring now to FIG. 1, the basic conveyors used in the invention will be described in relation to their function. An infeed conveyor 10 in the form of an ordinary belt conveyor running horizontally is positioned at the input end of the machine. Discrete units of product can be placed on the upper run of the conveyor 10 and when driven the product moves from right to left in FIG. 1. The conveyor 10 can be any convenient length and can be fed manually or automatically with units of product located at random without regard to spacing of the units which may, in fact, be abutting without any spacing therebetween.

Figure 1:
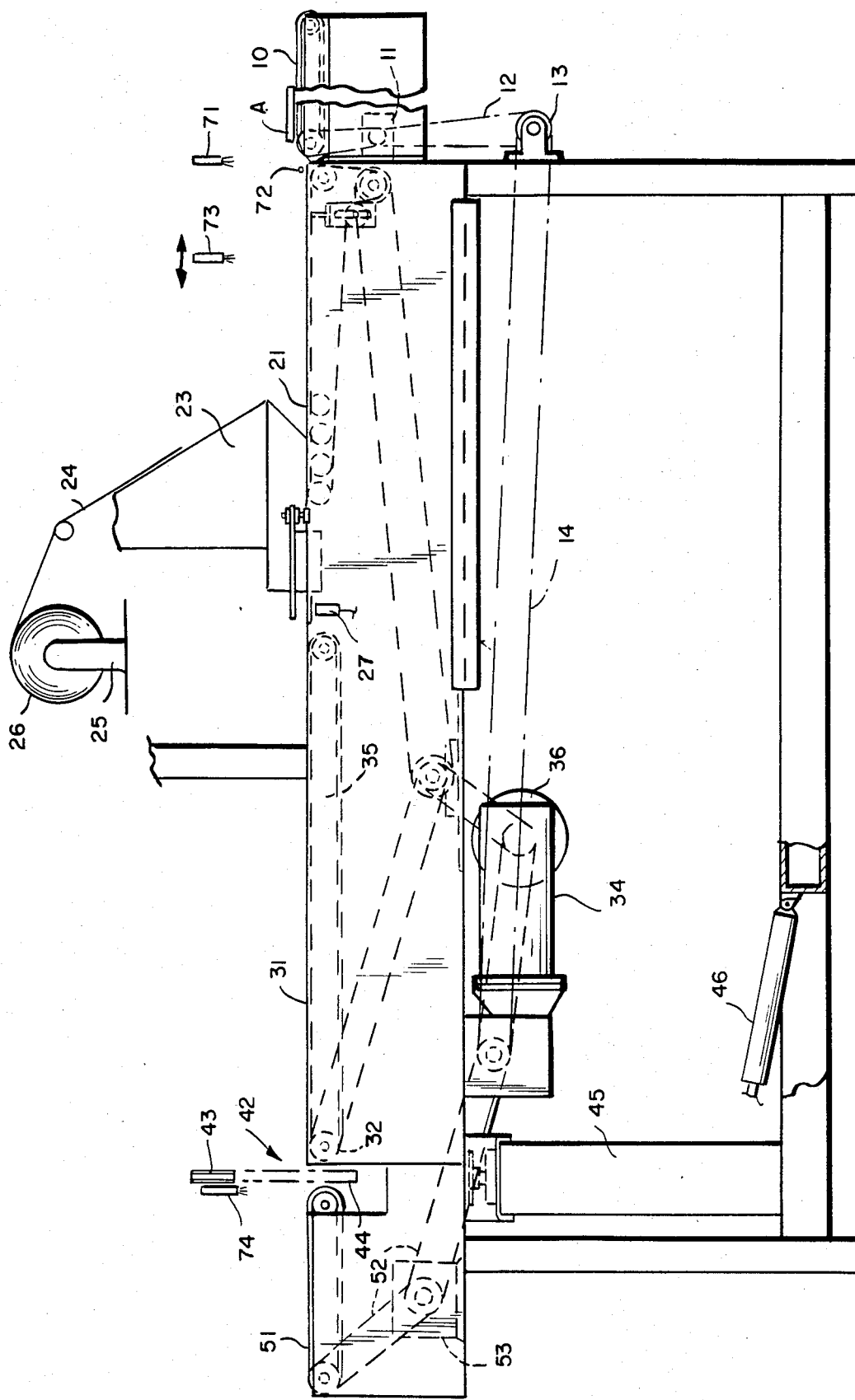
FIG. 1 is an elevational schematic view of a package wrapping machine in accordance with the invention having a stationary end sealer.

The infeed conveyor 10 is belt-driven from a clutch brake 11 which is driven from a main drive motor 34 via belt drive 12,13,14. The clutch brake 11 has shaft output which can be electrically controlled to drive or stop the infeed conveyor belt 10 as will be described.

Figure 2:
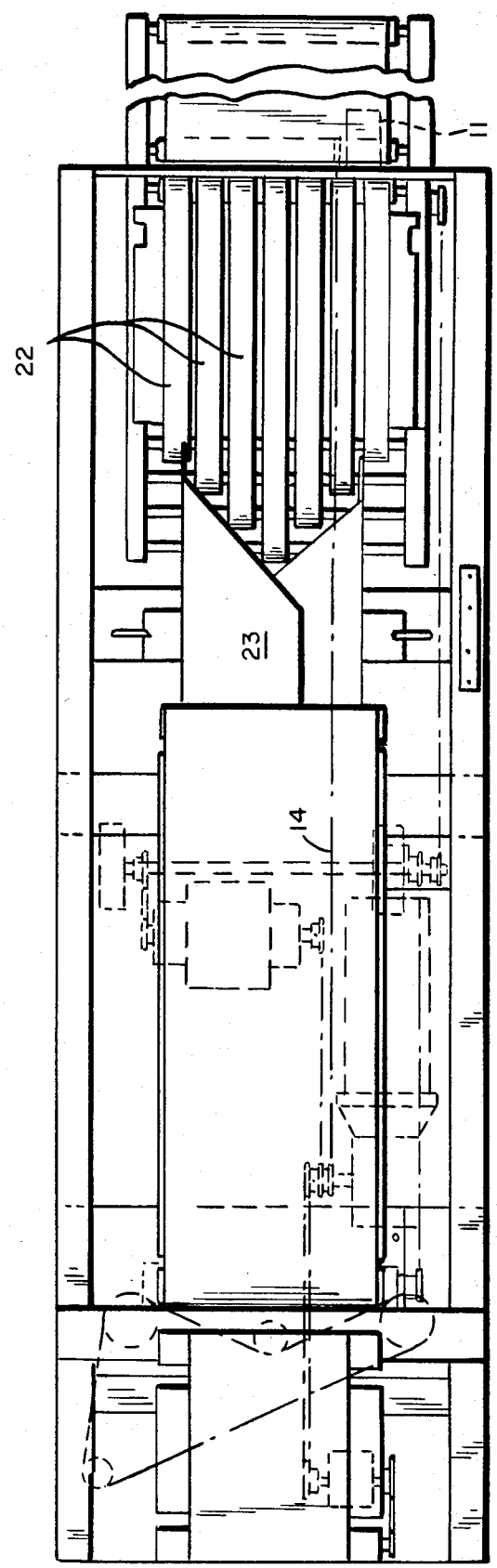
FIG. 2 is a plan view of the wrapping machine of FIG. 1.

The infeed conveyor 10 delivers product to a transfer conveyor 21 in a manner which will be more fully described. As disclosed more clearly in FIG. 2, the transfer conveyor 21 comprises a plurality of parallel belts 22, the longest of which is in the center and the adjacent ones are progressively shorter to provide delivery of discrete units of product to the center of a film forming head 23.

Film forming heads are well known per se and, accordingly, will not be described in detail. Generally, they comprise a shaped metal forming head over which a sheet of film 24 is drawn under tension from an unwinding stand 25 which may be power driven to rotate a roll 26 of single layer thermoplastic film. The tension with which the single layer of film 24 is drawn over the head 23 conforms it to the shape of the head such that the film forms a tube downstream from the forming head 23 with an opening in the tube into which the discrete units of product pass as the conveyor 21 delivers them into the opening. Once the film 24 is threaded over the forming head 23 and exits downstream therefrom it is held and advanced under tension by the force of a perforated vacuum head 31 which acts as a conveyor for the tube of film having the spaced units of product therein. The vacuum belt 31 is driven over spaced rollers, one of which 32 is driven from the main drive motor 34 through a clutch brake mechanism 36. To maintain the film 24 in contact with the belt 31, a vacuum box 35 is provided between the upper and lower runs of the belt 31 with openings in the top surface to draw a vacuum beneath the film tube which is supported on the surface of the belt 31.

A longitudinal sealing mechanism 27 is located at the exit of the forming head 23 just prior to the engagement of the film tube with the vacuum belt conveyor 31. This longitudinal seal element 27 may either apply static electricity or heat to continuously seal the overlapped edges of the film 24 which has been formed at the bottom of the tube emerging from the forming head 23.

At the end of the vacuum belt conveyor 31 is located the transverse seal mechanism generally designated 42. As shown in FIG. 1 the transverse seal mechanism comprises an upper transverse sealing jaw 43 and a lower transverse sealing jaw 44 which can be driven together to engage with the plastic film tube therebetween to form an end seal in the film which seals both edges as it severs the film to form individual packaged product. The formation of such seals and severing of the plastic tube is described, for example, in relation to FIG. 8 of U.S. Pat. No. 4,219,988, assigned to the assignee of the present application.

Downstream from the end seal mechanism 42 is a discharge conveyor 51 which receives the wrapped individual packages after the tube is severed by the transverse sealing jaws and delivers the wrapped packages to any desired destination, usually a shrink tunnel if the wrapper is a shrink film type. The conveyor 51 is also driven from the main drive motor 34 through a series of belt and pulley drive connections 52 and its motion is controlled by clutch brake mechanism 53.

The transverse end seal mechanism 42 is mounted on a stand 45 which adjusts the supported open jaws 43 and 44 in the vertical direction. By adjusting the normal open height of the jaws 43,44, the center line at which they engage can be made to coincide with one-half the height of the product being wrapped so that the transverse seal will occur approximately midway between the top and the bottom of the ultimate package. This arrangement, in addition to making a neater looking finished wrapped product, maintains uniform tension as the top and bottom of the tube are drawn together for making a seal and otherwise aids in uniform and smooth operation. The drive for making the seal jaws 43 and 44 move together and retract is via a mechanical linkage similar to that shown in FIG. 4, energized by a transverse jaw air cylinder 46.

The conveyors shown in FIG. 1 are controlled in response to product flow thereon by a series of photocells or other sensors which will now be described. A first photocell 71 is positioned above the infeed conveyor 10 to detect the arrival of the leading edge of a product at the discharge end of the infeed conveyor 10. A horizontal photocell 72 is positioned near the discharge end of and below the level of the top surface of the infeed conveyor 10 such that the light beam will be interrupted when the trailing end of a package drops from the level of infeed conveyor 10 to the level of transfer conveyor 21. This sequence can be seen more clearly by the details shown and described hereinafter with reference to FIG. 3. A third photocell 73 is positioned to detect the presence of product thereunder and produce a single when the trailing edge of that product passes the position of photocell 73. Photocell 73 is adjustably positioned to the right or left in FIG. 1 and selecting its position determines the spacing between units of product as they pass down the transfer conveyor 21 as will be more fully described. A fourth photocell 74 is positioned adjacent the transverse seal jaws mechanism 42 and conditioned to detect when the trailing edge of a package leaves the region directly thereunder. This position corresponds to the space between units of the product being transported by the system as determined by the location of the photocell 73 and hence assures that the signal from the photocell 74 calling for the transverse jaws 42 and 43 to come together will actually occur on the film tube at a position between packages and not on an individual unit of the product.

The transfer conveyor 21, the vacuum belt conveyor 31 and the discharge conveyor 51 are all driven in unison and at the same speed by belt linkages from the main drive motor 34 as previously described. The motor 34 has clutch brake units 36 and 53 which can be electrically controlled to apply driving power to the conveyors or interrupt the drive and apply a brake to hold the conveyors all in their position awaiting infeeding of more product or during the wrapping cycle when the conveyors must stop to permit a transverse seal to be made. As previously mentioned, the infeed conveyor 10 has a separate drive clutch brake 11 which can be separately controlled to start and stop the infeed conveyor 10.

Figure 3:
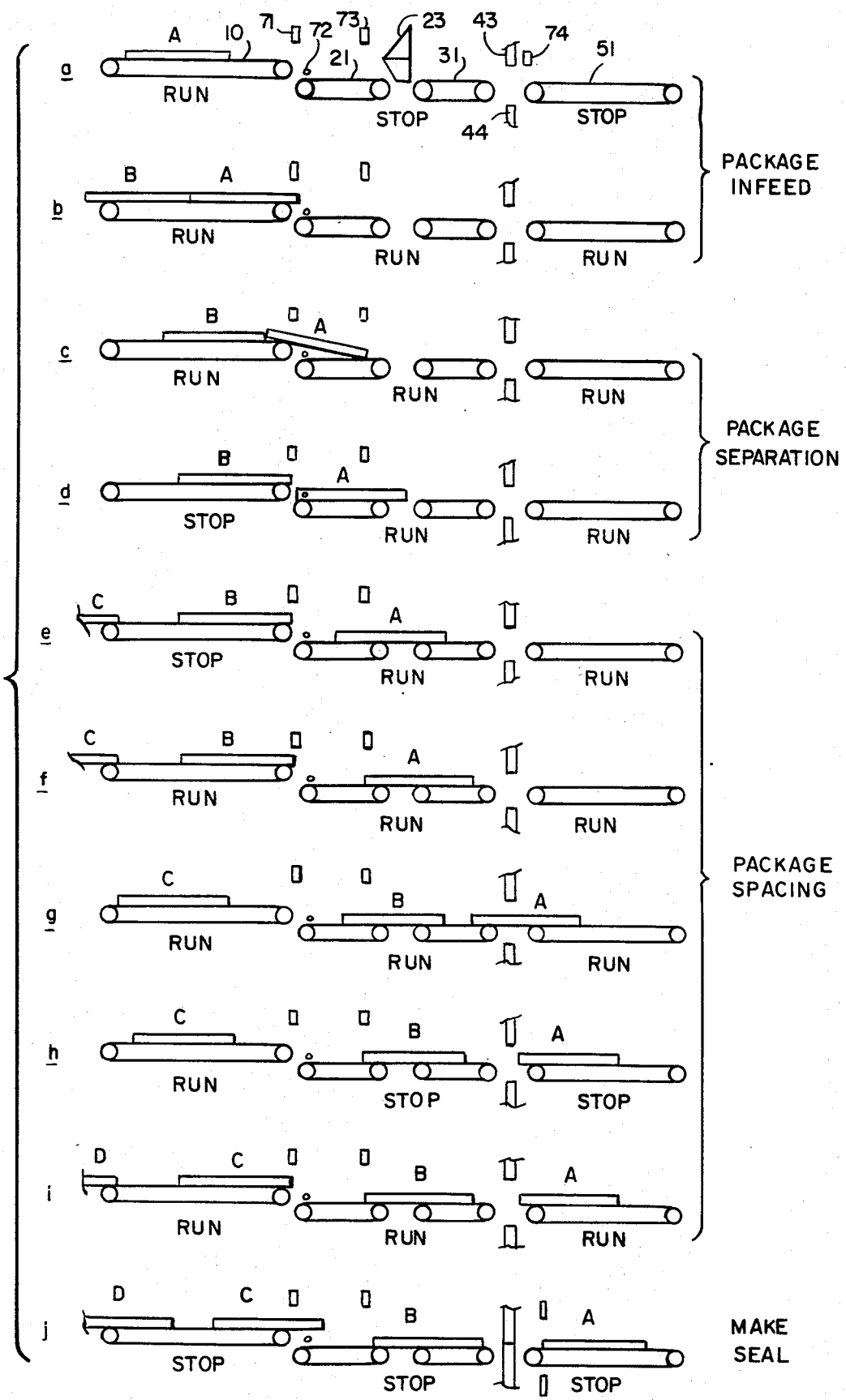
FIG. 3 is a set of schematic elevation views of the adjacent portions of the infeed conveyor and transfer conveyor showing control by photocell sensors of product position on the conveyors for the wrapping machine of FIG. 1.

Referring to FIG. 3, the detail of actuation of the photocells 71, 72 and 73 relative to the passage of units of product will now be described.

As previously mentioned, product can be randomly or continuously fed with any spacing or no spacing at all between units of product on the infeed conveyor 10 which is generally conditioned to run continuously. When the leading edge of a product interrupts the beam to be detected by photocell 71 that signal starts the main drive by releasing the brakes and engaging the clutches 36 and 53 of the main drive motor 34 so that the conveyors 21, 31 and 51 begin to run. As a unit of product A is delivered by the infeed conveyor 10 running at the speed of the transfer conveyor 21 it tilts initially and when its trailing edge finally clears the infeed conveyor 10 it drops flat on transfer conveyor 21 to produce a signal in photocell 72. That signal is applied to the drive clutch brake 11 to temporarily stop the infeed conveyor 10 if the next product is under photocell 71. If there is no product under photocell 71 conveyor 10 will continue to run. The infeed conveyor 10 is stopped until the trailing edge of the product A passes photocell 73 which is positioned to control the spacing between sequential units of product. Thus when a signal is produced by photocell 73 infeed conveyor 10 beings to run again. However, if photocell 71 is not producing a signal indicating the presence of product at the discharge end of infeed conveyor 10, the signal from photocell 73 stops the remaining conveyors 21, 31 and 51 by applying signal to the clutch brake units 36 and 53. This condition holds until the leading edge of the next unit of product arrives at photocell 71 at which time the operation as just described resumes. Thus if the infeed conveyor 10 for any reason is out of product or has a gap in the delivery of product it will not affect the normal spacing of product on the conveyors 21, 31 and 51 and the normal sequence with normal spacing will resume as soon as infeed conveyor 10 is supplied with and delivers product to its discharge end. At this point photocell 71 detects the arrival of product and starts the transfer conveyor 21 and the subsequent conveyors provided no transverse seal is being made at that time. The circuit for these controls sequences will be described with reference to FIG. 7.

Figure 4:
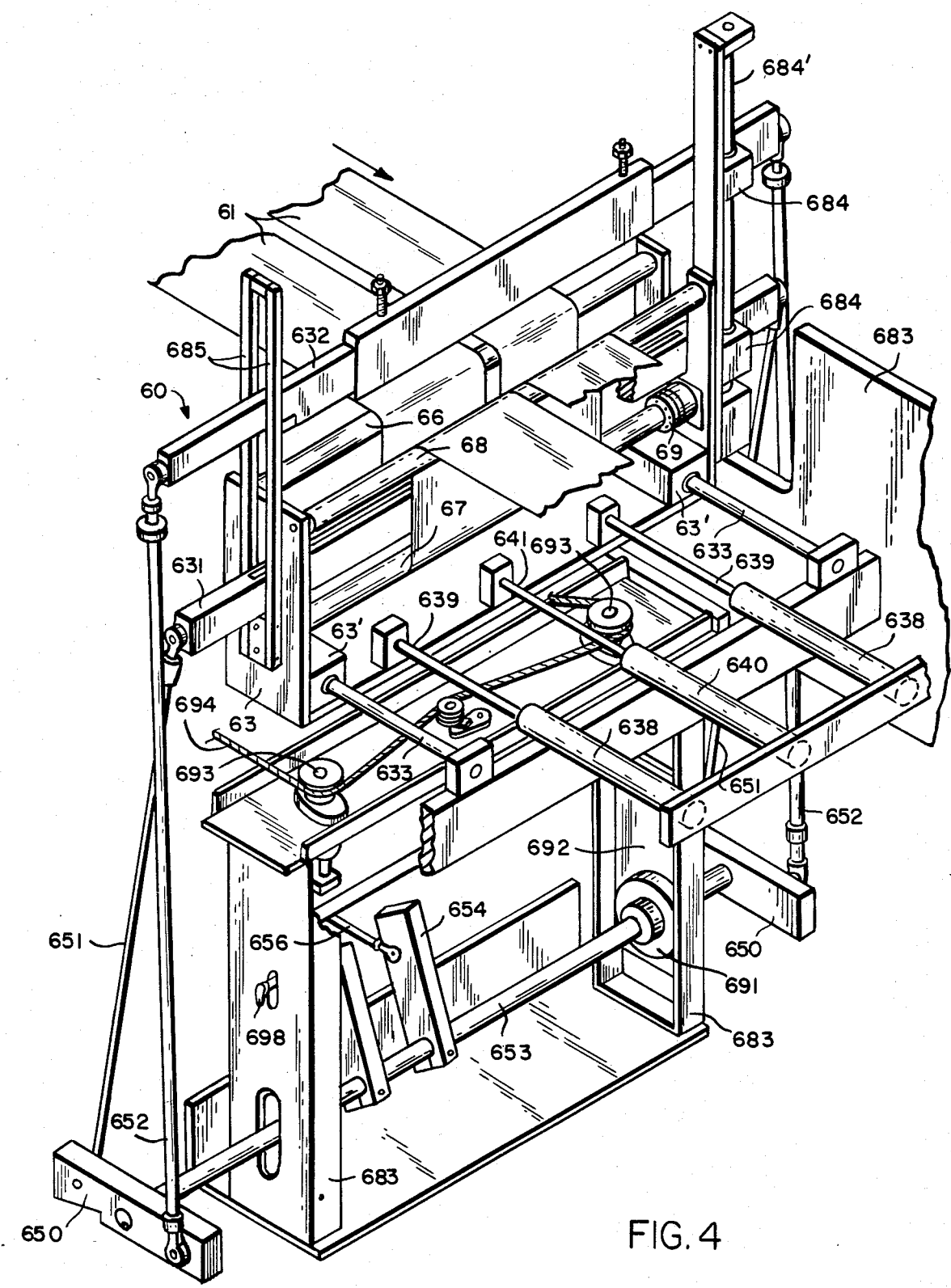
FIG. 4 is a perspective view of the end sealer used in a modification showing the belt conveyor and brake drive and the pneumatic return actuators for the end sealer carriage.

Referring to FIG. 4, the construction and operation of a modification which has a traveling end sealer will be described. In this modification product normally moves through the wrapping machine at a uniform rate without start-stop motion except for the sequencing of run and stop for conveyors 10 and 21 to achieve desired spacing between units of product. The machine thus is the same as that shown and described in FIG. 1 with the stationary end sealer 42 shown in FIG. 1 and the discharge conveyor 51 replaced by the traveling end sealer shown in FIG. 4. The modified control circuit for FIG. 4 is shown in FIG. 8.

Figure 8:
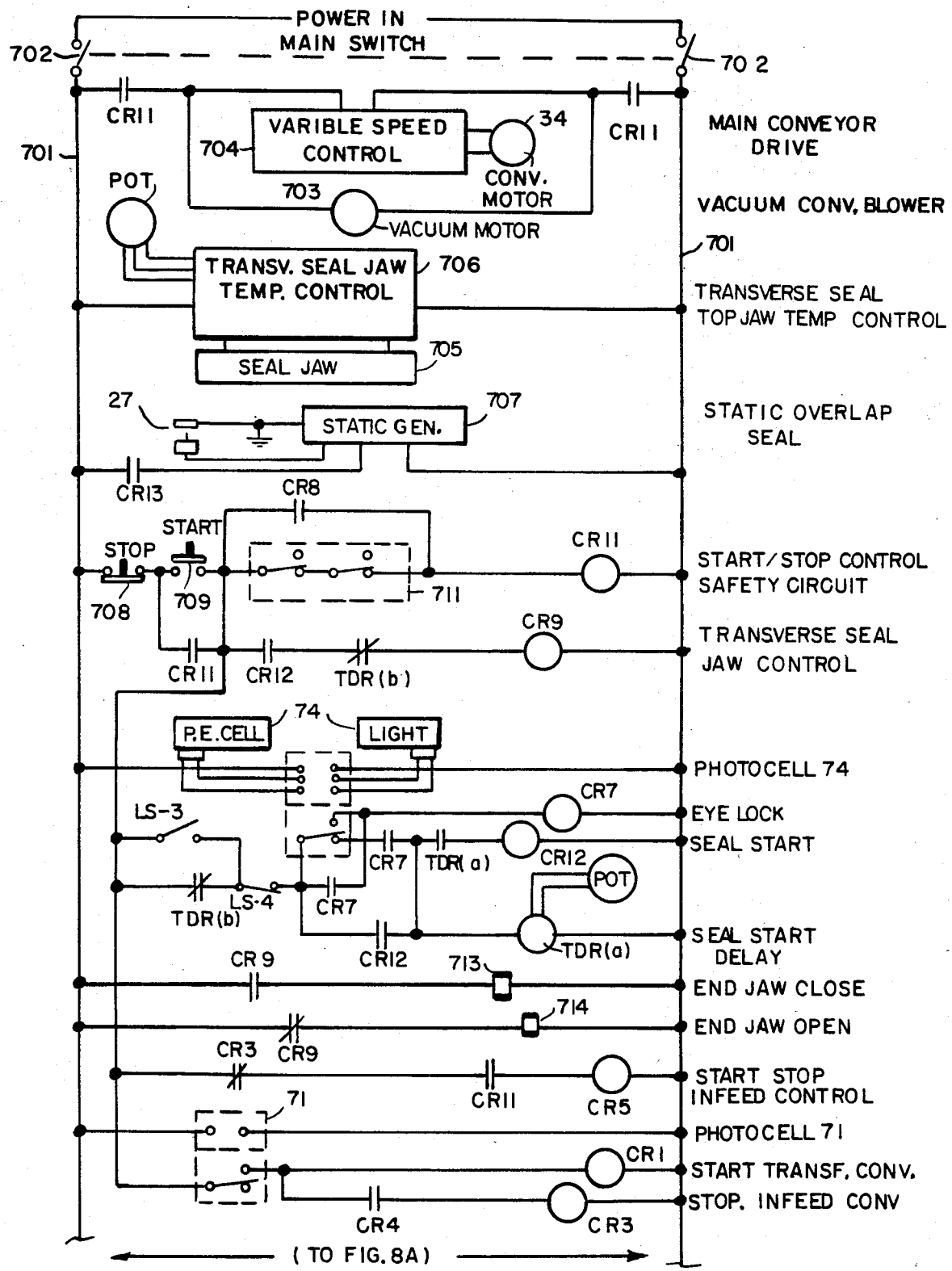
FIGS. 8 and 8A are schematic wiring diagrams showing the conveyor and carriage control circuits for the modification of FIG. 4.

The basic mechanism of FIG. 4 is similar to that disclosed in FIG. 8 of U.S. Pat. No. 4,218,988, assigned to the assignee of the present invention. A brief description of that mechanism as modified for the present invention follows.

The end seal mechanism 60, shown in FIG. 4 comprises a carriage 63 having bushings 63' which support it on horizontal shafts 633 which are fixed to frame 683. On one side, carriage 63 carries a vertical shaft 684' whereas on the other side, carriage 63 carries vertical support 685. The upper 632 and lower 631 jaws ends are attached to bushings 684 guided by shaft 684' and rest between supports 685. Each end of the upper jaw 632 is pivotally connected to spring located connecting rod 652 which is pivotally connected at its other end to an end of rocker arms 650. Each end of the lower jaw 631 is pivotally connected to connecting rod 651 which is pivotally connected to the other end of rocker arm 650. The rocker arms 650 are rotatably connected to frame 683 and are rotated by crank 654 which is driven by an air cylinder actuator 46 (FIG. 1).

Carriage 63 is also connected to cylinder rods 639 which are driven by pneumatic actuators 638.

The end seal mechanism 60 has two continuous conveyor belts 61. The belts 61 extend through the end sealing carriage 63 to an end roll at the end of the machine. Each end seal conveyor belt 61 drops down over a roll 66, under a bottom roll 67, and then over a roll 68 to form a "U".

The top of the "U" is at the same level as the belt 61 as it passes over the end rollers of conveyor 61. The rolls 66–68 are supported by the carriage 63. The depth of the "U" is sufficient to allow the lower jaw 631 of the end sealer carriage 63 to move down below the surface formed by the belt 61.

In the operation of the end sealer, the end sealing carriage 63, supported by bushings 63' on horizontal shafts 633, moves longitudinally in the direction of conveyor belt 61 at the same speed as the package in order to obtain time to make the seal end without having to stop the movement of the package through the machine. As the carriage 63 moves upstream or downstream the overall length of the belt 61 does not change, but the location of the "U" formed by the three rolls 66, 67 and 68 on the carriage 63 changes. This change is effected by braking roll 67 by means of electrically operated brake 69. When brake 69 stops roll 67 the carriage 63 is driven in the direction of movement of conveyor belt 61 and at the same speed.

The return travel of carriage 63 is driven by the pneumatic actuators 638. When air pressure is applied to actuators 638 and at the same time brake 69 is released, the extension of piston rods 639 returns carriage 63 to its normal at rest position awaiting the arrival of the next package. The carriage 63 is held in its normal position by a pneumatic actuator 640 which has its piston rod 641 connected to the carriage 63. The cylinders of actuators 638 and 640 are fixed to the frame 683. The sequence and control of the actuators 638, 640 and brake 69 will be described in detail with reference to FIGS. 5, 6 and 8.

The end seal jaws 631, 632 are caused to come together and to open in synchronism with the longitudinal back and forth motion of the carriage 63. The jaws are brought together during the forward motion of the carriage 63 and at closure the jaws move at the same velocity as the film surrounded packages. After completion of the sealing which occurs during the closure of the jaws, the jaws open sufficiently to clear the next succeeding package and travel back toward the input where they remain open and stationary until signaled to move in the forward direction and to close for the next sealing operation.

In order that the end seal be made near the center line of the package, the jaws 631, 632 are caused to be moved as a unit in the same direction to cause the distance above the belt 31 at which they meet to be at the approximate center line of the package being sealed. In order to accomplish this jaw movement, drive shaft 653, it bearings 691, and bearing support plates 692 are moved relative to the channeled housing 683 as shown in FIG. 4. As shaft 653 is moved up or down, the connecting rods 651, 652 cause the jaws 632, 631 respectively, to also move up or down. Locking clamps 698 secure plates 692 to housing 683 at the desired height. The bearings 691 attached to plates 692 are moved in unison by individual screwdrives 693 which are in turn rotated by a common chain 694 attached to a sprocketed height control wheel, not shown. Thus, rotation of the wheel causes the screws to raise the shaft 653 for a high profile package or to lower it for a low profile package. The seal jaws 631, 632 are guided on one side of the carriage 63 by bushings 684 on vertical shaft 684'. On the other side of the carriage, the jaws are guided by two pieces of vertically extending rectangular steel bars 685. The top and bottom jaws have pads of low friction bearing surfaces bolted to them at the points of contact with the vertical supports 685. The vertical supports 685 are used rather than bushings in order to accommodate the expansion of the jaws without the binding which would occur if bushings were used on both ends of the jaws since the jaws become hot and expand in length as seals are being made.

Figures 5, 6:
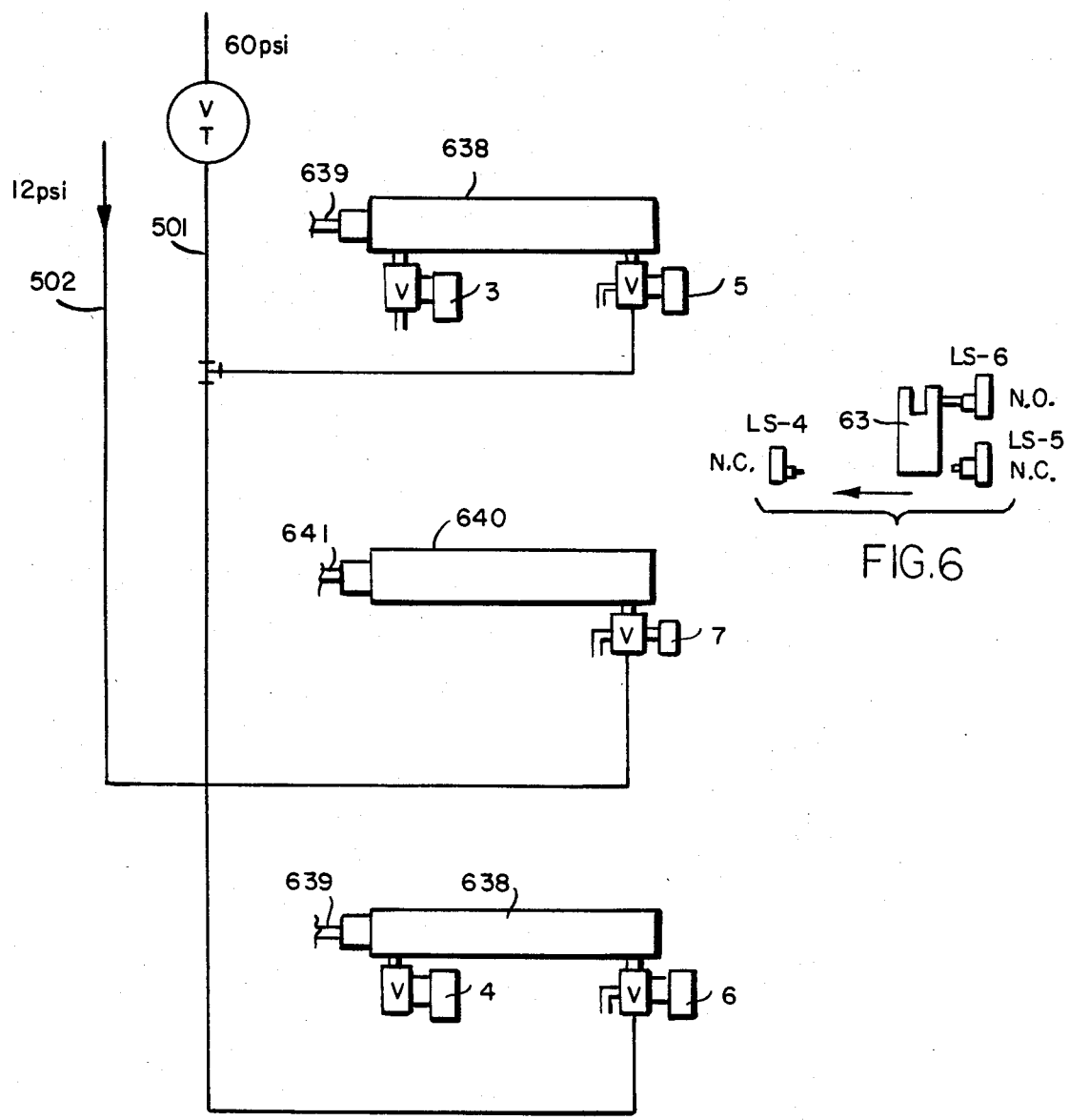
FIG. 5 is a schematic view of the pneumatic actuator control for the end sealer of FIG. 4.
FIG. 6 is a detail of the placement of switches relative to the end sealer carriage for controlling the actuators of FIG. 5.

Referring now to FIGS. 5 and 6, the pneumatic return and hold mechanism for the end seal carriage will be described. As shown in FIG. 4, return pneumatic actuator 638 and hold actuator 640 are connected to the carriage in a manner to return it to its normal position when their piston rods are extended. In FIG. 5 high pressure air is supplied on line 501 and low pressure air is supplied on line 502. The high pressure air of line 501 is connected to solenoid actuated valves 5 and 6 on the cylinders 638 respectively and low pressure air on line 502 is connected to a solenoid actuated value 7 on hold cylinder 640. The valve 7 on cylinder 640 operates to either supply low pressure air to the cylinder 640 to hold its piston extended or to vent the cylinder chamber of 640.

Similarly, the valves 3 and 4 on the cylinder 638 act to either vent that end of the cylinders to atmosphere or to close the venting passage to trap air to snub the forward motion of the carriage as will be described.

Referring to FIG. 6 the location of limit switches operated by the motion of the carriage 63 will be described. As indicated schematically in FIG. 6 the carriage 63 moves in the direction of the arrow when a seal is being made. When the seal is completed or if it reaches the end of its travel it begins its return stroke. On the return stroke driven by the pneumatic actuator 638 the carriage 63 first actuates a normally open limit switch LS-6 and when it has fully returned actuates a normally closed limit switch LS-5.

The sequence of operation of the valves and actuators during a sealing cycle will now be described. When photosensor 74 detects the position of a package such that a seal is to be made, the carriage 63 starts to move with the belts 61 upon actuation of brake 69, and simultaneously solenoid valve 7 is deenergized to vent cylinder 640 to atmosphere, thereby relieving the holding pressure and its resistance to travel of carriage 63. At the completion of the sealing cycle, a relay is actuated which energizes solenoid valves 5, 6 and 7 to start the return travel of the carriage 63 and to energize hold cylinder 640. In the event that the sealing cycle should not be completed by the time the carriage reaches its full downstream position, limit switch LS-4 wll be actuated and will energize solenoids 5, 6 and 7 to return the carriage to its starting position while simultaneously opening the seal jaws 43, 44 in order to prevent a jam-up of product. Shortly before the carriage 63 is fully returned it energizes and actuates limit switch LS-6 which energizes solenoid valves 3 and 4, thereby closing cylinders 638 to atmosphere such that the entrapped air acts as a cushion or snubber for the return motion of carriage 63. As the carriage 63 reaches the full return position, it actuates limit switch LS-5 which deenergizes valves 3, 4, 5 and 6, thus venting the snubber cylinders to atmosphere and removing high pressure air from the return cylinders 638. This condition leaves the holding cylinder 640 energized to maintain the carriage 63 in its normal upstream position.

Although it would be possible to operate the carriage motion using only the brake 69 and the return cylinder 638 without the use of holding cylinder 640, such operation would not be as advantageous. The high pressure air entrapped in closing cylinders 638 would not vent as quickly as the brake 69 would operate and, thus, the brake and cylinders would be opposing each other at the start of the downstream stroke. This operation would lead to excessive wear on brake 69 as well as higher stresses on belt 61 and the conveyor drive system.

Figure 7:
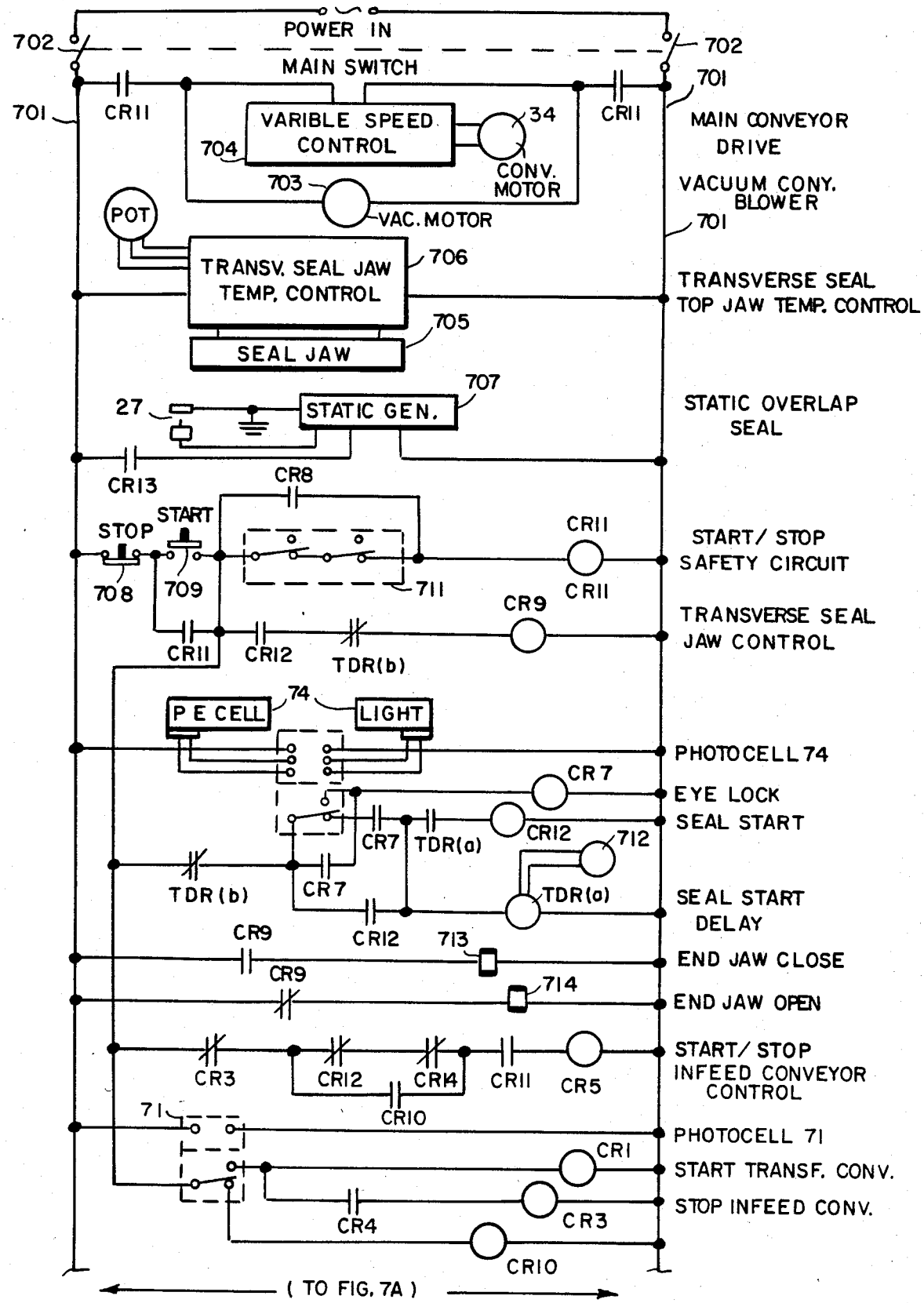
FIGS. 7 and 7A are schematic wiring diagrams showing the conveyor and end seal jaws control circuits for the embodiment of FIG. 1.

Referring to FIG. 7 and 7-a, the operating and control circuits for the embodiment of FIG. 1 will be described. Electric power is supplied on line 701 for the various circuits by power switch 702. Power is transmitted by switch 702 to the transverse seal jaw temperature control 706, to the control circuit of photocells 71, 72, 73, & 74 and to the rectifiers for clutch brakes CB1, CB2, & CB3.

The upper seal jaw 43 has a heater element 705 therein, the temperature of which can be controlled by temperature control 706.

The longitudinal sealing means 27 is disclosed as a static electricity probe and grounding shoe energized from the high voltage static generator 707 which is energized through contact CR13, although alternatively a thermal sealer with a temperature control similar to 706 could be used.

Start-stop control and safety circuit provisions are made by a circuit that energizes relay CR11 through normally closed stop switch 708 and a normally open start switch 709 which is paralleled by seizing contact CR11. Upon closure of the start switch, CR11 pulls in, seizing through contacts CR11. In the event that an obstruction is encountered during jaw closure, safety switches 711 mounted on the seal jaw will open unlocking CR11. To enable the jaw to close to make a seal, contact CR8 overrides safety switches 711 when the jaw is nearly closed. Closure of CR11 energizes variable speed control 704 supplying power to conveyor motor 34 and it energizes vacuum motor 703 which provides the vacuum for the vacuum belt conveyor. It should also be noted that CR11 closes enabling points in the infeed conveyor, transfer conveyor, and discharge conveyor, start and stop controls, and also the solenoid valve 713 and 714 controlling end jaws up and down such that if the stop button or safety switches 711 are activated, all conveyors will stop and the end jaws will open.

Upon starting the machine if photocell 71 sees no package, CR11 contacts energize relay CR5 though normally closed contacts CR3, CR12, and CR14 which starts the infeed conveyor by energizing clutch 11 by closing normally open contacts CR5 and de-energizing brake 11 by opening normally closed contacts CR5 causing the infeed conveyor to run. When the first package passes photocell 71, it energizes CR1 which in turn energizes CR2 which locks itself in through contacts CR2 and normally closed contacts CR6 and simultaneously energizes contact CR2 in the transfer conveyor start-stop control circuit through normally closed contact CR14 and CR12 and enabling contact CR11 to energize relays CR13 and CR15. The transfer conveyor is started by CR13 energizing clutch C/B2 and de-energizing brake C/B2, and the discharge conveyor is started by CR15 energizing clutch C B3 and de-energizing brake C/B3. When CR13 starts the transfer conveyors, it simultaneously energizes the static generator to provide the longitudinal seal.

When product passes through photocell 71 and drops in front of photocell 72, it energizes CR4 which closes contact CR4 leading to photocell 73 and simultaneously closes contacts in series with CR3. When product leaves photocell 71, if the next product in line again energizes photocell 71 while the first product is energizing photocell 72, CR4 contacts will close energizing CR3, which opens normally closed contacts de-energizing CR5 which de-energizes clutch C/B1 and energizes brake C/B1 stopping the infeed conveyor. However, if there is no product immediately following the first, photocell 71 will have returned to its condition as shown so that power will not go through to relay CR3 and the infeed conveyor will continue to run.

When the trailing end of product drops in front of photocell 72, it energizes CR4. Since by now the lead end of the product will have energized photocell 73, CR4 locks itself in through contact CR4 leading between photocells 72 and 73. When the trailing end of product passes by photocell 73, it unlocks CR4, thereby de-energizing CR3 (if energized) permitting the infeed conveyor to commence to run. If photocell 71 shows the presence of product, CR10 will be de-energized so that when photocell 73 shows no product, normally open contact CR10 will prevent CR6 from energizing and the transfer and discharge conveyors will continue to run. If, on the other hand, there is no product present under photocell 71, the return of photocell 73 will energize CR6 through closed contacts CR10, de-energizing CR2 which in turn de-energizes CR13 and CR15 stopping the transfer and discharge conveyors to await more product.

As product passes under photocell 74, it energizes 74 energizing CR7 which seizes through contacts CR7 which lock in through normally closed contacts on TDR B and it simultaneously closes enabling contacts CR7 leading to TDR A. When the trailing end of the product passes by photocell 74, the photocell is de-energized which energizes TDR A through enabling contact CR7. TDR A permits the package to pass downstream a short distance so that the seal can be made exactly midway between succeeding products. Upon timing out TDR A energizes CR12 through enabling contacts CR7, the photocell 74, and normally closed contact TDR B. CR12 energizes CR9 through normally closed contacts TDR B and enabling contacts CR11. Contacts CR9 energize end jaw close solenoid 713 while de-energizing end jaw open solenoid 714 thereby closing the seal jaws. CR12 simultaneously de-energizes CR13 and CR15 thereby stopping the discharge and transfer conveyors. CR12 will also open de-energizing CR5 which de-energizes the infeed conveyor if there is product present under photocell 71. However, if no product is present under 71, contacts CR10 will keep CR5 energized keeping the infeed conveyor running.

When the seal jaw reaches its nearly closed position, it will activate LS1 and LS2. LS1 energizes TDR B and CR8. TDR B when it times out, de-energizes CR9 which permits the seal jaws to open. CR8 overrides safety switches 711 during the sealing cycle. Upon completion of the sealing cycle, the seal jaw will start to open but for a short portion of the travel maintain LS2 in an open condition, thereby de-energizing CR14 and by opening normally closed contact CR14, will prevent the discharge conveyor and transfer conveyor from starting until the end seal jaw has opened far enough to be clear of product. Simultaneously, CR14 normally closed contacts will de-energize CR5 and prevent the infeed conveyor from running if product is present under photocell 71.

Figure 7A:
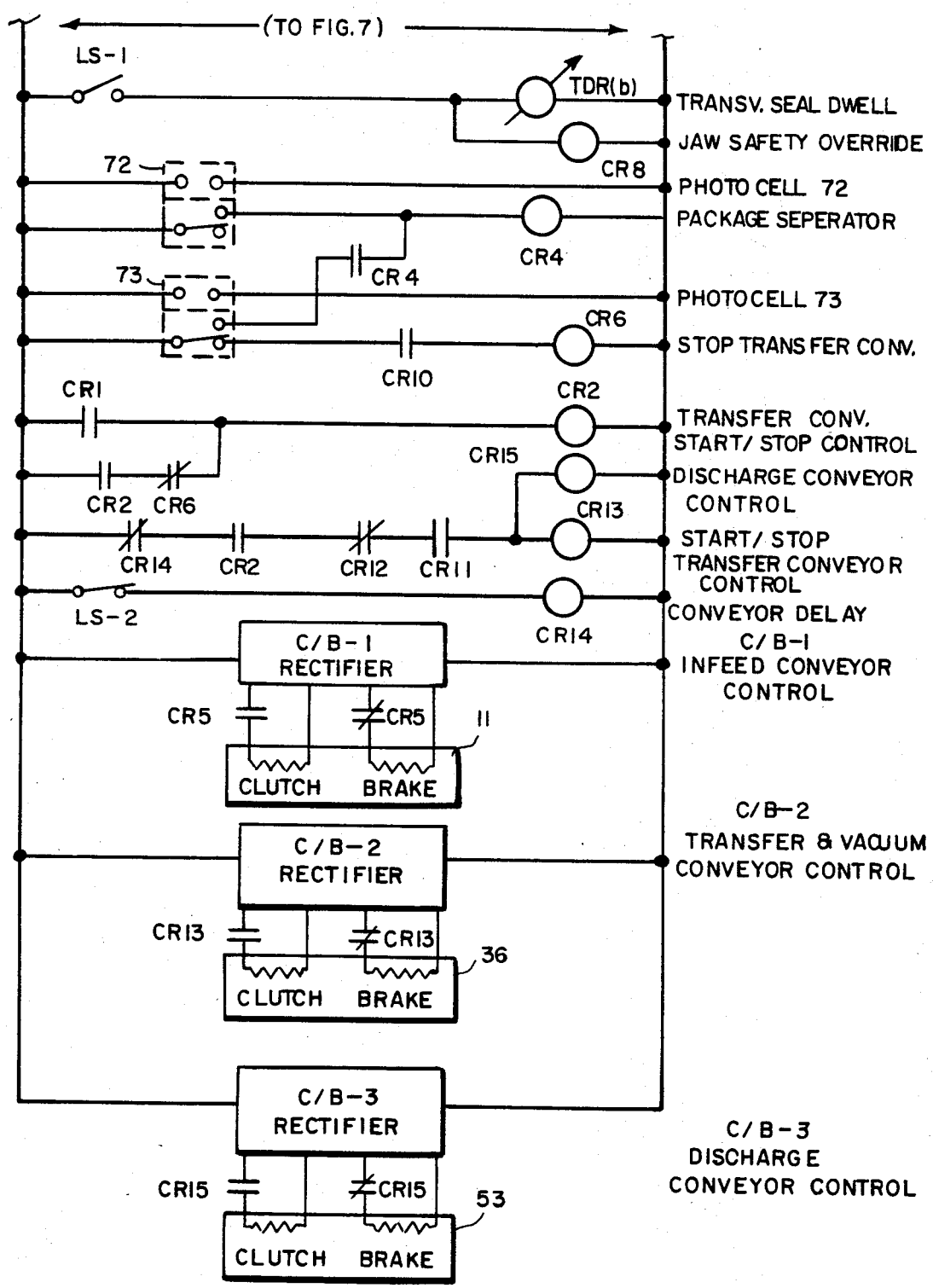
Figure 8A:
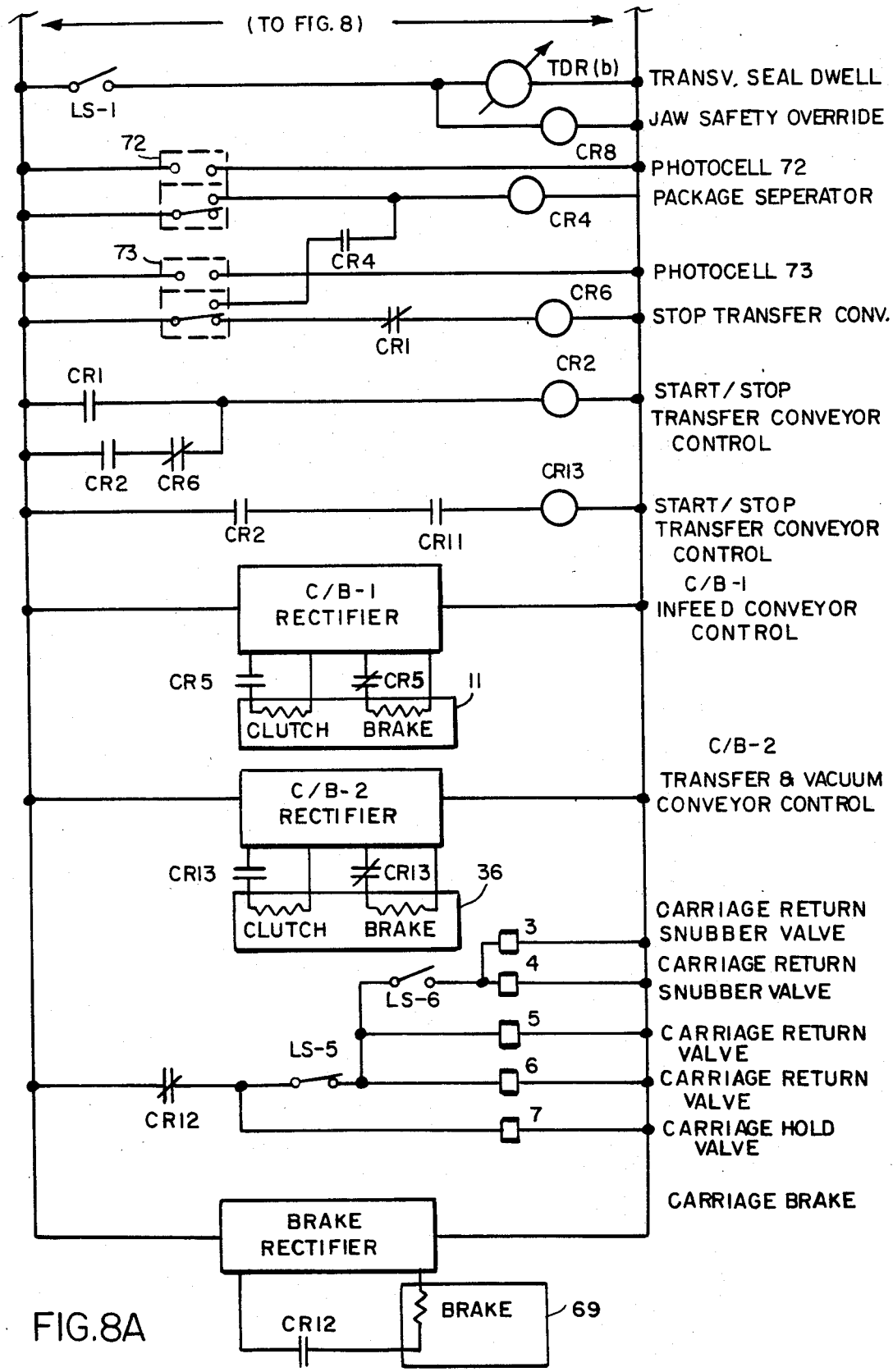

Referring to FIG. 8 and 8a, a description of the control circuit for the modification of the invention shown in FIG. 4 will be given. FIG. 8 and 8a have a substantial portion that is a duplication of FIG. 7 and 7a which will not be described. The portions of FIG. 8 and 8a which differ from FIG. 7 and 7a in order to control the movable seal jaws of FIG. 4 will be described.

First, the change in the conveyor drive involves elimination of discharge conveyor 51 with a clutch brake 53 and separate rectifier C/B3 controlled by relay CR15 and substitution, therefore, of conveyor 61 of FIG. 4 driven directly from the clutch brake 36 controlled by C/B2.

Conveyors 21, 31, and 61 all operate together in the modificaion of FIG. 4. Thus the transfer, vacuum, and end seal conveyors operate from C/B2 control by relay CR13 which is energized whenever both control relays CR2 and CR11 are energized. CR2 is the transfer conveyor start-stop control operating directly in response to photocell 71 as controlled by CR1 and thus the machine operates continuously unless photocell 71 on infeed conveyor 10 detects the absence of packages.

The limit switch LS2 of FIG. 7a is not present in FIG. 8 since its function is accomplished by LS3 to be described later.

Since in the modification shown in FIG. 4 the conveyors are not required to stop while the seal is being made, the primary function of CR10 as shown in FIG. 7 of overriding contacts CR12 and CR14 to energize CR5 to keep the infeed conveyor running if no product is present while a seal is being made, has been eliminated, and consequently, CR10 has been eliminated. The function of contacts CR10 in the circuit with photocell 73 to energize CR6 to stop the transfer conveyor in the event of absence of product under photocell 71 has been replaced by normally closed contacts CR1 in the same location.

Using the description of FIG. 7 and 7a as modified as described above, the entire operation and sequencing of the conveyors to pass product through the machine will be readily understood. The operation of the seal jaws and the movable carriage 63 of the end seal mechanism 60 as shown on FIG. 4 will now be described.

When product passes under photocell 74, it signals the start to the seal cycle in the manner as described in the explanation of FIG. 7 and 7a. Added to the circuit are LS3 and LS4. LS4, as shown in FIG. 6, is a safety switch to prevent overtravel of the carriage by de-energizing CR12 which de-energizes the carriage brake through contacts CR12 in the carriage brake circuit and energizes the carriage return valves 5 and 6 through contacts CR12 in the carriage return circuit. LS3, located on the seal jaw mechanism, locks in CR12 until the jaws open sufficiently to clear the package for the return stroke in normal operation.

The operation of the carriage 63 is as follows. When the trailing end of product passes photocell 74, TDR A is energized and upon timing out, energizes CR12 through enabling contact CR7, safety limit LS4, and normally closed contact TDR B. CR12 also energizes CR9 through contacts TDR B and CR11 to initiate the seal jaw closure by means of solenoids 713 and 714 and engages the carriage brake 69 through points CR12. Simultaneously, CR12 de-energizes carriage hold solenoid 7.

When the jaws close, they energize TDR B as previously described, and when TDR B times out, it opens normally closed contact TDR B, de-energizing CR9 to re-open the end jaws by energizing solenoid 714 and de-energizing solenoid 713. As the end jaws start to open, they de-energize LS3 which, since TDR B contacts have been previously opened, de-energizes CR12 which de-energizes carriage brake 69 and simultaneously energize carriage return solenoids 5 and 6 and carriage hold solenoid 7. As the carriage nears the end of its return stroke, it operates LS6, closing solenoid valves 3 and 4 to snub the carriage travel. Upon final seating of the carriage, LS5 operates to de-energize solenoids 3, 4, 5, and 6 of the carriage return circuit.

TDR B is the time delay relay which controls and permits selection of the dwell time of the transverse sealing jaws 631, 632. Making a good seal in thermoplastic film depends on many factors including type of film, temperature of the sealing jaws, jaw clamping pressure and jaw closure dwell time. In a continuously running machine of the type disclosed in FIG. 4 the distance the carriage travels is a function of machine speed alone provided the carriage returns in time to seal the next package since dwell time is established by TDR B selected to assure a good seal. Thus the control system operates to automatically minimize carriage travel as a function of belt speed thereby permitting maximum machine speed for each different product length. Further gains in machine speed are achieved because the pneumatic return actuators 638 provide consistently fast return of the carriage 63 independently of machine speed.

Although the invention has been described with reference to a form fill seal wrapping machine that uses flat film formed into a tube over a forming head, other types of form fill seal machines can also be adapted to practice the invention. For example, film forming heads which use the inverting head as disclosed in Shanklin U.S. Pat. No. Re. 30,010 can be readily adapted to provide a machine that uses folded film and a film forming head of the film inverting type to form folded film by passing it through an inverting head. Thus, in the embodiment disclosed in FIG. 1 of this application an inverting head, folded film supply and side sealer of the type disclosed in applicants' U.S. Pat. No. 4,219,988 can be substituted for the forming head 23 and flat film supply 26 and longitudinal sealer 27. In such a machine the folded film supply would be from the side, for example, as shown in FIG. 1 of U.S. Pat. No. 4,219,988. Such modifications and other variations will now be readily practiced by those skilled in the art from the teaching found herein. Accordingly, the claims are not to be construed as limited to the presently disclosed embodiments.

What is claimed is:

1. A continuous run horizontal form fill seal wrapping machine operable to uniformly space wrap and seal discrete product units without use of flighted conveyors comprising:

an infeed conveyor and a transfer conveyor arranged in horizontal in-line sequence to move discrete units of product through the machine;

a film forming head adapted to form film received from a roll of film on an unwind stand into a tube surrounding said product as it moves on said transfer conveyor;

means for supporting said transfer conveyor below said infeed conveyor to provide a vertical offset between the discharge end of said infeed conveyor and the adjacent input end of said transfer conveyor, the amount of vertical offset being sufficient to enable detection of drop of the trailing edge of product delivered by said infeed conveyor onto said transfer conveyor;

control means for said conveyors comprising:

means for normally running said infeed conveyor;

means responsive to the arrival of product at the discharge end of said infeed conveyor for running said transfer conveyor;

means responsive to detecting said drop for stopping said infeed conveyor until said transfer conveyor has run a predetermined distance afer said drop for producing predetermined spacing between sequential units of product on said transfer conveyor;

means responsive to absence of product on said infeed conveyor for maintaining said transfer conveyor stopped after it has run said predetermined distance and until product again arrives at the discharge end of said infeed conveyor for preventing said stopping of said infeed conveyor until the next arrival of product at said discharge end of said infeed conveyor;

an end sealing mechanism for said wrapping machine having:

a carriage mounted on said machine for reciprocating longitudinal motion along the direction of travel of the continuous stream of spaced units of product enclosed in said tube of film, said tube delivered by a conveyor belt to pass through said end sealing mechanism;

upper and lower sealing jaws mounted on said carriage for movement transverse to said longitudinal motion above and below the path of said tube containing said product;

brake means operable to engage said carriage to said conveyor belt to move said carriage with said tube as it travels through said mechanism;

actuator means for closing said sealing jaws on said tube in the space between said units as said carriage travels with said film and thereafter opening said jaws, said jaws when closed simultaneously sealing the ends of said tube and severing the film tube between successive units of product;

pneumatic actuators operable for returning said carriage in the opposite direction to the travel of said film; and control means for operating said brake means and said actuator means to close said jaws on said film tube between said units while said carriage moves with said film tube to seal and sever said film and reopen said jaws after the film tube is sealed and severed, said control means releasing said brake means and energizing said pneumatic actuators to return said carriage as soon as said jaws reopen, said conveyor belt driven and stopped in synchronism with said transfer conveyor.

2. In a horizontal form fill seal wrapping machine having conveyors to transport discrete product through the machine and a film forming head located at an intermediate position on said conveyors to receive units of product and to form film into a tube that surrounds the product as it travels through and beyond the forming head with means for start-stop controlling of said conveyors such that randomly fed units of said product are substantially uniformly spaced from each other in the direction of travel within said tube as said tube containing said product travels downstream of said forming head, the improvement comprising:

an end sealing mechanism comprising a carriage mounted on said machine for reciprocating longitudinal motion along said direction of travel;

means for delivering said tube containing said product to pass through said end sealing mechanism;

brake means operable to engage the conveyor belt such that said carriage travels with the speed and in said direction of travel of said tube to provide one direction of said reciprocating motion;

upper and lower sealing jaws mounted for movement with said carriage, said jaws positioned above and below said tube containing said product and operable for movement transverse to said longitudinal motion;

a pneumatic actuator for driving said carriage longitudinally of said frame to provide the return for said reciprocating longituding motion;

actuator means operable for closing said sealing jaws when said carriage travels in said direction of travel of said tube and opening said jaws upon the return movement of said carriage; and control means for said actuator means and said brake means for synchronizing the closing of said sealing jaws on that portion of the film between said units to simultaneously seal the ends of said tube and sever the film between successive units at the seal while moving said carriage longitudinally at approximately the same velocity and direction as said film when said jaws are closed, said control means energizing said pneumatic actuator to return said carriage in the opposite direction to said film after said seal is made when said jaws are opened, said end sealing mechanism having means to deliver said sealed packages to the output of said machine.

3. An end sealing mechanism for wrapping machine comprising:

a carriage mounted on said machine for reciprocating longitudinal motion along the direction of travel of the continuous tream of spaced units of product enclosed in tube of film, delivered by a conveyor belt to pass through said end sealing mechanism;

upper and lower sealing jaws mounted on said carriage for movement transverse to said longitudinal motion above and below the path of said tube containing said product;

brake means operable to engage said carriage to said conveyor belt to move said carriage with said tube as it travels through said mechanism;

actuator means for closing said sealing jaws on said tube in the space between said units as said carriage travels with said film and thereafter opening said jaws, said jaws when closed simultaneously sealing the ends of said tube and severing the film tube between successive units of product;

pneumatic actuators operable for returning said carriage in the opposite direction to the travel of said film; and control means for operating said brake means and said actuator means to close said jaws on said film tube between said units while said carriage moves with said film tube to seal and sever said film and reopen said jaws after the film tube is sealed and severed, said control means releasing said brake means and energizing said pneumatic actuators to return said carriage as soon as said jaws reopen.

4. Apparatus according to claim 3 and including a pneumatic holding actuator operable when energized to maintain said carriage in upstream position, means for normally energizing said pneumatic holding actuator except upon operation of said brake means to move said carriage and means for deenergizing said pneumatic actuators upon completion of return of said carriage.

5. Apparatus according to claim 4 and including means operable near the end of return of said carriage for valving the exhaust of said pneumatic actuators to entrap air to cushion the shock of said carriage reaching its upstream position.

6. Apparatus according to claims 3, 4 or 5 wherein said control means reopens said jaws after a dwell time which is no longer than necessary to make the seal.

7. Apparatus according to claims 3, 4 or 5 in which the dwell time of closure of said sealing jaws can be controlled independently of machine speed and distance of carriage travel is determined by jaw closure time and velocity of product through the machine.

8. Apparatus according to claims 3, 4 or 5 wherein said control means reopens said jaws after a dwell time which is no longer than necessary to make a good seal and said dwell time is controlled independently of machine speed thereby making distance of carriage travel to make a seal a function of jaw closure time and velocity of product through the machine.

9. Apparatus according to claim 3 wherein said pneumatic actuators return said carriage at a speed which is independent of machine speed.

10. A continuous run horizontal form fill seal wrapping machine operable to uniformly space wrap and seal discrete product units without use of flighted conveyors comprising:

an infeed conveyor and a transfer conveyor arranged in horizontal in-line sequence to move discrete units of product through the machine;

a film forming head adapted to form film received from a roll of film on an unwind stand into a tube surrounding said product as it moves on said transfer conveyor;

means for supporting said transfer conveyor below said infeed conveyor to provide a vertical offset between the discharge end of said infeed conveyor and the adjacent input end of said transfer conveyor, the amount of vertical offset being sufficient to enable detection of drop of the trailing edge of product delivered by said infeed conveyor onto said transfer conveyor;

control means for said conveyors comprising:

means for normally running said infeed conveyor;

means responsive to the arrival of product at the discharge end of said infeed conveyor for running said transfer conveyor;

means responsive to detecting said drop for stopping said infeed conveyor until said transfer conveyor has run a predetermined distance after said drop for producing predetermined spacing between sequential units of product on said transfer conveyor;

means responsive to absence of product on said infeed conveyor for maintaining said transfer conveyor stopped after it has run said predetermined distance and until product arrives at the discharge end of said infeed conveyor; and means responsive to the absence of product at the discharge end of said infeed conveyor for preventing said stopping of said infeed conveyor until the next arrival of product at said discharge end of said infeed conveyor.

11. Apparatus according to claim 10 and including means responsive to the absence of product at the discharge end of said infeed conveyor for preventing said stopping of said infeed conveyor until the next arrival of product at said discharge end of said infeed conveyor.

12. In a substantially horizontal form fill seal wrapping machine having a lug-free infeed conveyor and a lug-free transfer conveyor arranged in sequence to move units of product through the machine, a film forming head located along said conveyors and adapted to form film received from a roll of film on an unwind stand into a tube surrounding said product as it moves on said transfer conveyor, the improvement comprising:
- an infeed conveyor which will accept and run with random location of product thereon;
- means for normally running said infeed conveyor at a predetermined fixed speed;
- means for starting said transfer conveyor to run at substantially the same fixed speed as said infeed conveyor in response to a unit of product reaching a predetermined point of delivery from said infeed conveyor to said transfer conveyor;
- means responsive to completion of delivery of a unit of product from said infeed conveyor to said transfer conveyor for stopping said infeed conveyor;
- means for restarting said infeed conveyor upon travel of a unit of product a predetermined distance on said transfer conveyor; and
- means responsive to the absence of product at said predetermined point on the infeed conveyor for stopping said transfer conveyor after it has run said predetermined distance.

13. Apparatus according to claim 1 and including means responsive to the absence of product at said predetermined point on the infeed conveyor for preventing stopping of said infeed conveyor.

14. Apparatus according to claim 1, or 13 wherein said transfer conveyor is positioned in line with and below said infeed conveyor to provide a vertical offset between the discharge end of said infeed conveyor and the adjacent input end of said transfer conveyor and wherein said means for stopping said infeed conveyor is responsive to detection of when the trailing edge of a unit of product drops onto said transfer conveyor.

15. Apparatus according to claim 1 further comprising control means which includes a first sensor positioned to sense presence or absence of product at said predetermined point of delivery, said point located at the discharge end of said infeed conveyor; a second sensor for sensing completion of said delivery to said transfer conveyor and a third sensor selectively positionable at a predetermined spacing from said discharge end of said input conveyor, said spacing corresponding to the desired spacing between sequential product on said transfer conveyor.

16. Apparatus according to claim 15 wherein said control means includes means responsive to said first sensor detecting presence of product for running said transfer conveyor, means responsive to said second sensor detecting said delivery for stopping said infeed conveyor and means responsive to said third sensor detecting the absence of product for restarting said infeed conveyor.

17. Apparatus according to claim 16 and including means responsive to said third sensor detecting the absence of product in combination with said first sensor detecting the absence of product for stopping said transfer conveyor.

18. Apparatus according to claims 15, 16 or 17 wherein said transfer conveyor is positioned in line with and below said infeed conveyor to provide a vertical offset between the discharge end of said infeed conveyor and the adjacent input end of said transfer conveyor and wherein said second sensor is positioned to detect when the trailing edge of a unit of product drops onto said transfer conveyor.

19. Apparatus according to claim 1 and including transverse sealing means for said tube located downstream of said forming head, a discharge conveyor located immediately downstream from said transverse sealing means, and means responsive to arrival of a unit of product at a predetermined position relative to said sealing means for initiating a cycle of operation of said sealing means.

20. Apparatus according to claim 19 including means responsive to initiation of a sealing cycle for stopping said transfer and discharge conveyor for the duration of the sealing cycle.

21. Apparatus according to claim 19 having means for moving said transverse sealing means at the speed of and in the same direction of travel as said tube during said sealing cycle and means for returning said sealing means to an initial position after each sealing cycle.

* * * * *

UNITED STATES PATENT AND TRADEMARK OFFICE
CERTIFICATE OF CORRECTION

PATENT NO. :  4,537,016
DATED      :  August 27, 1985
INVENTOR(S):  Shanklin et al.

It is certified that error appears in the above-identified patent and that said Letters Patent is hereby corrected as shown below:

Col. 4, l. 59:  change "per se" to --*per se*--

Col. 5, l. 5:   change "head" to --belt--

Col. 6, l. 6:   change "single" to --signal--

Col. 7, l. 64:  change "seal end" to --end seal--

Col. 10, l. 32: change "though" to --through--

Col. 11, l.68:  change "modificaion" to --modification--

Col. 13, l. 63: change "afer" to --after--

Col. 15, l. 27: change "tream" to --stream--

Signed and Sealed this

Twenty-second Day of April 1986

[SEAL]

Attest:

DONALD J. QUIGG

Attesting Officer

Commissioner of Patents and Trademarks